United States Patent [19]

Kawabe et al.

[11] Patent Number: 4,706,771
[45] Date of Patent: Nov. 17, 1987

[54] VEHICLE STEERING CONTROL SYSTEM USING DESIRED VEHICLE MODEL

[75] Inventors: Taketosi Kawabe, Tokyo; Ken Ito, Yokohama, both of Japan

[73] Assignee: Nissan Motor Co., Ltd., Japan

[21] Appl. No.: 823,324

[22] Filed: Jan. 28, 1986

[30] Foreign Application Priority Data

Jan. 31, 1985 [JP] Japan .................................. 60-15513
Jul. 12, 1985 [JP] Japan .................................. 60-152564

[51] Int. Cl.⁴ ............................................ B62D 5/06
[52] U.S. Cl. .................................. 180/142; 180/140; 364/424
[58] Field of Search ........................ 280/771, 6 H, 91; 364/424, 425; 180/132, 140, 141, 142, 143

[56] References Cited

U.S. PATENT DOCUMENTS

| | | | |
|---|---|---|---|
| 3,011,579 | 12/1961 | Milliken | 180/142 |
| 3,866,706 | 2/1975 | Lincke | 180/142 |
| 3,897,846 | 8/1975 | Inoue | 180/142 |
| 4,175,638 | 11/1979 | Christensen | 180/140 |
| 4,412,594 | 11/1983 | Furukawa | 180/142 |
| 4,418,780 | 12/1983 | Ito | 180/142 |
| 4,441,572 | 4/1984 | Ito | 180/140 |
| 4,476,529 | 10/1984 | Nakamura | 364/424 |

FOREIGN PATENT DOCUMENTS

0079754 6/1980 Japan .................................. 180/142
0026366 2/1984 Japan .................................. 180/140

Primary Examiner—Richard A. Bertsch
Attorney, Agent, or Firm—Leydig, Voit & Mayer

[57] ABSTRACT

A vehicle steering control system has a steering wheel angle sensor, a vehicle speed sensor, a control unit and an actuator for steering either (or both) of front and rear wheel pairs of a controlled vehicle. The control unit determines desired values of yaw rate and lateral acceleration corresponding to the sensed steering wheel angle and vehicle speed by using at least one desired mathematical vehicle model having desired vehicle response characteristics. Then, the control unit determines a desired value of a front or rear wheel steer angle (or both of the front and rear wheel angles) theoretically required to achieve the desired value of the yaw rate, and another desired value of the steer angle theoretically required to achieve the desired value of the lateral acceleration. Finally, the control unit determines a weighted average of two desired values of the steer angle by using weights which are functions of vehicle speed and/or steering wheel angular speed. The actuator steers the front or rear wheel pair so that an actual steer angle is maintained equal to the weighted average.

20 Claims, 25 Drawing Figures

VEHICLE STEERING CONTROL SYSTEM USING DESIRED VEHICLE MODEL

BACKGROUND OF THE INVENTION

1. Field of the Invention

This invention relates to a vehicle steering control system capable of controlling vehicle steering response characteristics freely.

2. Description of the Prior Art

In a conventional vehicle having only a mechanical steering linkage, front wheels are steered in accordance with a steering input such as a steering wheel angular displacement. Therefore, the steering response characteristics are fixedly determined by the make of the vehicle.

3. Description of the Related Art

New steering control systems are disclosed in the following four copending U.S. patent applications in the name of Ken ITO et al. (1) Ser. No. 755,352 filed July 16, 1985; (2) Ser. No. 773,650 filed Sept. 9, 1985; (3) Ser. No. 773,621, filed Sept. 9, 1985 (4) Ser. No. 773,622, filed Sept. 9, 1985. Each of these control systems postulates a desired vehicle having desired cornering characteristics independently of the actual vehicle controlled by the system. By using data (vehicle parameters) of the desired vehicle, and equations of motion of the desired vehicle, a control unit such as a microcomputer of each system determines a desired value of a vehicle motion variable such as yaw rate corresponding to instantaneous values of a steering wheel angle and vehicle speed of the controlled vehicle. That is, desired value of the motion variable is determined according to the desired characteristics of the desired vehicle independent of the actual characteristics of the controlled vehicle. Then, the control system steers either or both of front and rear wheel pairs of the controlled vehicle to such an amount that the actual vehicle motion variable becomes equal to the desired value.

Therefore, these control system can control the cornering characteristics of the controlled vehicle freely without the restraint of the actual body construction of the controlled vehicle. For example, these control systems can endow the controlled vehicle of a sedan type with characteristics of a sports car by choosing the desired vehicle of a sports car type.

These systems can control only one motion variable when only one of the front and rear wheel pairs is manipulated. In the case that the yaw rate is chosen as a controlled variable, for example, these systems cannot provide satisfactory characteristics of a vehicle lateral acceleration especially when the steering wheel is turned rapidly at high vehicle speeds.

SUMMARY OF THE INVENTION

It is an object of the present invention to provide a vehicle steering control system which can control vehicle response characteristics more freely and adequately especially at high vehicle speeds.

According to one aspect of the present invention, a steering control system for a controlled vehicle comprises means for sensing a steering wheel angle of the controlled vehicle means for sensing a vehicle speed of the controlled vehicle, control means connected with the steering wheel sensing means and vehicle speed sensing means, and actuating means for steering at least one wheel of the controlled vehicle under command of the control means.

The control means determines desired values of first and second vehicle motion variables corresponding to a steering wheel angle sensed by the steering wheel angle sensing means and a vehicle speed sensed by the vehicle speed sensing means, by using one or more desired vehicle models. Then the control means determines first and second desired values of a steer angle, respectively, from the desired values of the first and second vehicle motion variables, by parameters characterizing the actual steering response of by the controlled vehicle. Finally, the control means determines a weighted average of the first and second desired values of the steer angle, and sends a command signal representing the weighted average to the actuating means. The actuating means steers at least one wheel of the controlled vehicle so that an actual steer angle of the wheel is maintained equal to the weighted average.

DETAILED DESCRIPTION OF THE INVENTION

Figure 1:
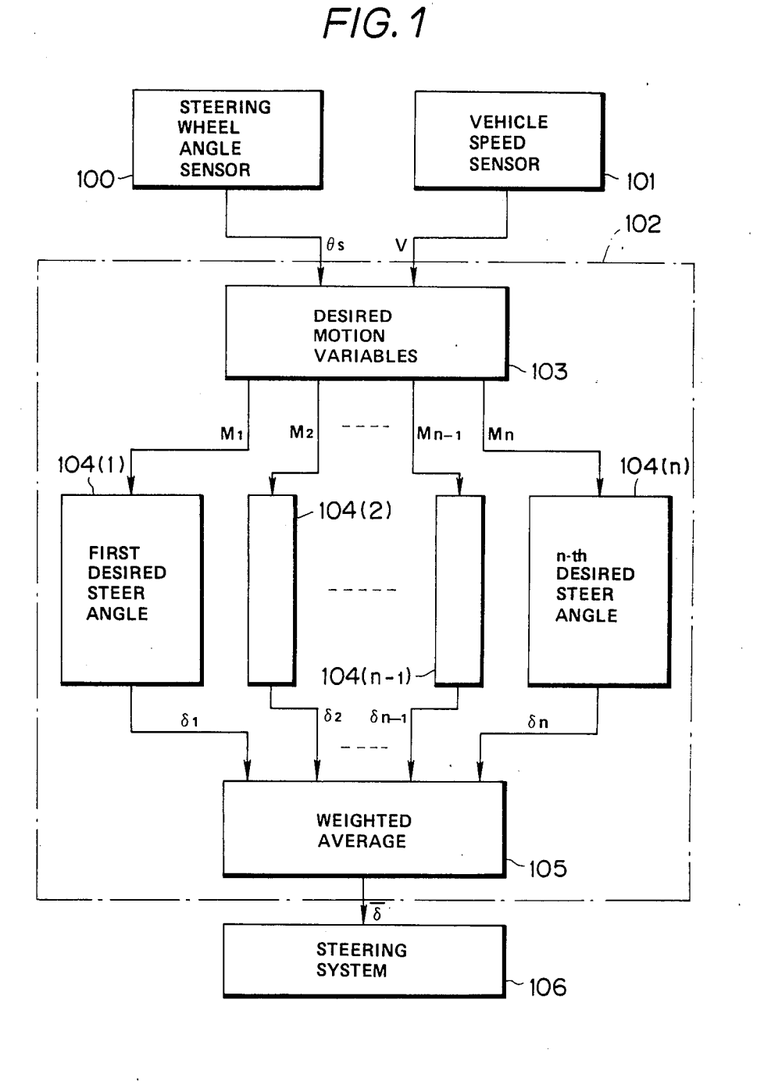
FIG. 1 is a block diagram of a first aspect of the present invention.

FIG. 1 shows a first aspect of the present invention. A steering wheel angle sensor or sensing means 100 and a vehicle speed sensor or sensing means 101 are connected to a control unit or means 102.

A desired motion variable determining means 103 of the control means 102 determines desired values $M_1-M_n$ (n is a natural number) of vehicle motion variables of different kinds, corresponding to a steering wheel angle $\theta_s$ sensed by the steering wheel angle sensing means 100 and a vehicle speed V sensed by the vehicle speed sensing means 101 by performing mathematical operations according to one or more desired vehicle model having desired resonse characteristics.

A plurality of desired steer angle determining meanS 104(1)-104(n) of the control means 102 receive the desired value $M_1$-$M_n$, respectively, and determine desired values $\delta_1$-$\delta_n$ of a steer angle for at least one of the front and rear wheel pairs of the controlled vehicle, by parameters characterizing the actual steering response of the controlled vehicle.

A weighted average determining means 105 of the control means 102 determines a final desired steer angle $\bar{\delta}$ which is equal to a weighted average of the desired values $\delta_1$-$\delta_n$ of the steer angle determined by the desired steer angle determining means 104(1)-104(n).

Then, an actuator such as a hydraulic actuator of a steering system 106 of the controlled vehicle steers at least one of the front and rear wheel pairs in accordance with the final desired value $\bar{\delta}$.

Figure 2:
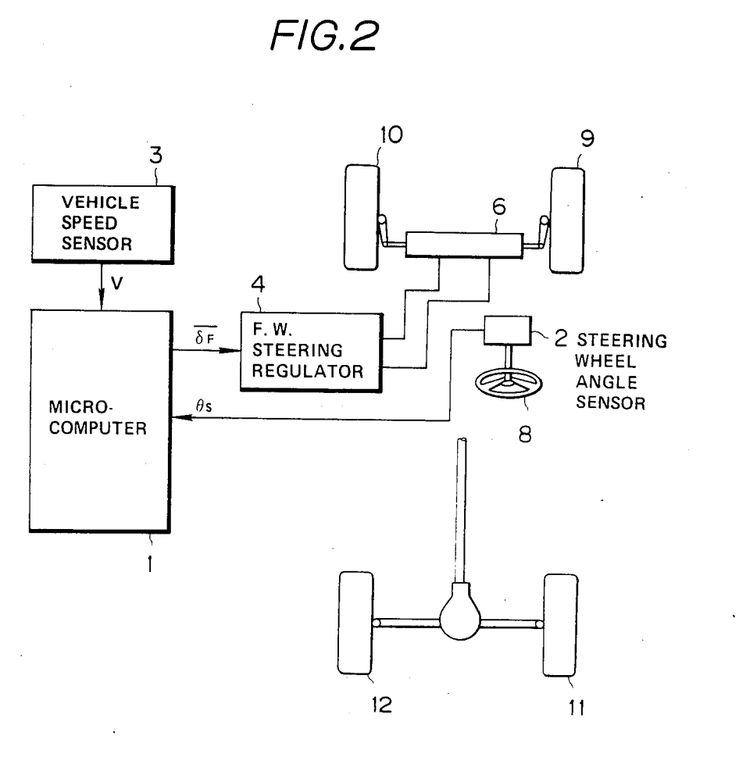
FIG. 2 is a schematic view showing a first embodiment according to the first aspect of the invention.

A first embodiment of the present invention is shown in FIG. 2.

A control unit or means 1 such as a microcomputer or other electric circuitry is connected with a steering wheel angle sensor 2 for sensing a steering input such as an angular displacement $\theta_s$ of a steering wheel of a controlled vehicle, and a vehicle speed sensor 3 for sensing a vehicle speed V of the controlled vehicle. The microcomputer 1 receives the steering wheel angle $\theta_s$ and the vehicle speed V from the sensors 2 and 3, and performs operations to determine desired values of two or more vehicle motion variables and a final desired value $\bar{\delta}_F$ of a front wheel steer angle.

A front wheel steering regulator 4 is arranged to steer front wheels 9 and 10 of the controlled vehicle by controlling a hydraulic front wheel actuator 6 in response to an output signal of the microcomputer 1 representing the final desired value $\bar{\delta}_F$ of the front wheel steer angle.

Figure 3:
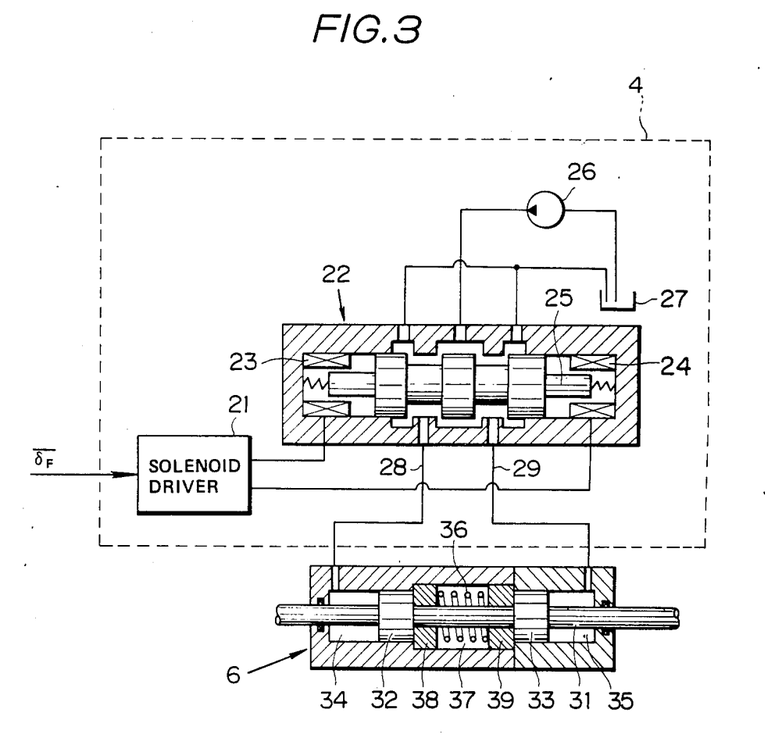
FIG. 3 is a schematic view of a front wheel steering regulator and a hydraulic steering actuator shown in FIG. 2.

FIG. 3 shows examples of the front wheel steering regulator 4 and actuator 6. The hydraulic steering actuator 6 has two pistons 32 and 33 and a shaft 31 both ends of which are connected. respectively, with tie rods. The actuator 6 steers the wheels 9 and 10 by moving the shaft 31 axially in accordance with an oil pressure difference between right and left oil chambers 34 and 35.

In a central chamber 37 of the actuator 6, discs 38 and 39 are loosely mounted on the shaft 31. A spring 36 is disposed between the discs 38 and 39 for biasing the discs in the opposite directions. The spring 36 serves to restore the shaft 31 to its neutral position when the oil pressure is drained from the right and left chambers 34 and 35.

The front wheel steering regulator 4 has a solenoid driver 21, a control valve 22, an oil pump 26 and an oil tank 27.

The control valve 22 has oil passages 28 and 29 leading respectively, to the left and right oil chambers 34 and 35 of the hydraulic actuator 6. The control valve 22 further has a spool 25 which regulates the oil flow rate through the oil passages 28 and 29 by moving axially. Left and right ends of the spool 25 are surrounded, respectively, by left and right electromagnetic solenoids 23 and 24 so tha the spool 25 is moved axially by the solenoids 23 and 24 to regulate the oil supplies to the left and right chambers 34 and 35.

The solenoid driver 21 supplies a current signal proportional to the final desired value $\bar{\delta}_F$ of the front wheel steer angle determined by the microcomputer 1 to either of the left and right solenoids 23 and 24 which is selected in accordance with a steering direction.

In this embodiment, rear wheels 11 and 12 of the controlled vehicle are not steered, and only the front wheels 9 and 10 are steered.

Figure 4:
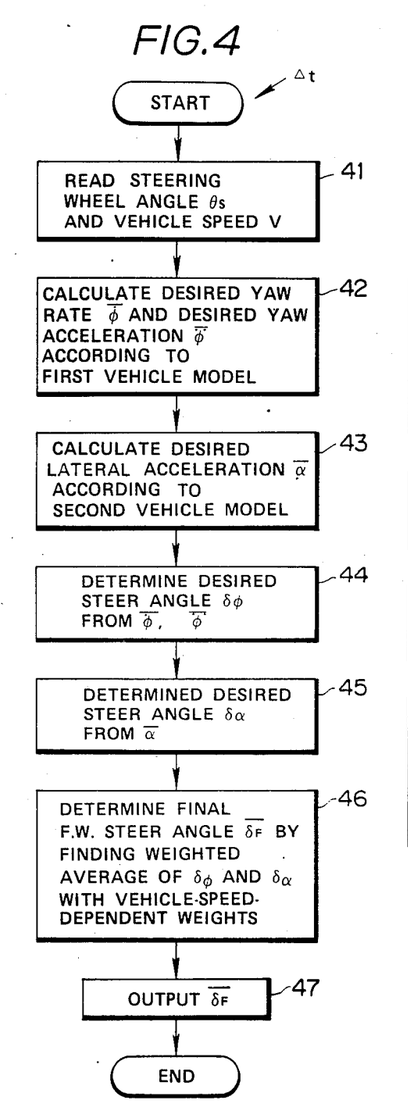
FIG. 4 is a flowchart of a program executed by a microcomputer of the first embodiment.

FIG. 4 shows a program executed by the microcomputer 1. Initialization is performed when an ignition switch is turned on and power is supplied. The microcomputer 1 repeats the program regularly at intervals of a time length $\Delta t$.

At a step 41, a central processing unit (CPU) of the microcomputer 1 reads an instantaneous value of the sensed steering wheel angle $\theta_s$ and an instantaneous value of the sensed vehicle speed V which are inputted to the microcomputer 1 from the steering wheel angle sensor 2 and the vehicle speed sensor 3.

At a step 42, the CPU reads values of vehicle parameters of a first desired vehicle which are stored in a memory. Then, the CPU performs operations to determine one or more desired values of a yawing motion corresponding to the instantaneous values of the steering wheel angle $\theta_s$ and the vehicle speed V by solving equations of vehicle motion for the first desired vehicle by use of the values of the vehicle parameters of the first desired vehicle and the instantaneous values of $\theta_s$ and V. In this embodiment, the CPU determines a desired value $\bar{\phi}$ of a yaw rate (yaw angular velocity) and a desired value $\bar{\ddot{\phi}}$ of a yaw acceleration.

The first desired vehicle is a real or postulated imaginary vehicle having desired characteristics relating to the yawing motion.

In this embodiment, the following vehicle parameters of the first desired vehicle are used.

$I_{Z1}$ = a yawing moment of inertia of the first desired vehicle.

$M_1$ = a vehicle mass of the first desired vehicle.

$L_{F1}$ = a distance between a front axle and a center of gravity of the first desired vehicle.

$L_{R1}$ = a distance between a rear axle and the center of gravity of the first desired vehicle.

$N_1$ = an overall steering ratio of the first desired vehicle.

$K_{F1}$ = a cornering power of each of front wheels of the first desired vehicle.

$K_{R1}$ = a cornering power of each of rear wheels of the first desired vehicle.

The desired value $\bar{\phi}$ of the yaw rate and the desired value $\bar{\ddot{\phi}}$ of the yaw acceleration are determined by using the following equations.

$$M_1(\dot{V}_{y1}+\dot{\phi}_1 V)=2C_{F1}+2C_{R1} \tag{1}$$

$$I_{Z1}\ddot{\phi}_1=2L_{F1}C_{F1}-2L_{R1}C_{R1} \tag{2}$$

$$C_{F1} = K_{F1}\left\{\frac{\theta_s}{N_1} - (V_{y1} + L_{F1}\dot{\phi}_1)/V\right\} \tag{3}$$

$$C_{R1} = -K_{R1}(V_{y1}-L_{R1}\dot{\phi}_1)/V \tag{4}$$

$$\bar{\ddot{\phi}}=\ddot{\phi}_1 \tag{5}$$

$$\bar{\dot{\phi}}=\dot{\phi}_1 \tag{6}$$

where
$\dot{\phi}_1$ = a yaw rate of the first desired vehicle,
$\ddot{\phi}_1$ = a yaw acceleration of the first desired vehicle,
$V_{y1}$ = a side velocity (or speed) of the first desired vehicle in the y-direction of the vehicle axis system.
$\dot{V}_{y1}$ = a side slipping acceleration of the first desired vehicle in the y-direction,
$C_{F1}$ = a cornering force of each of the front wheels of the first desired vehicle, and $C_{R1}$ = a cornering force of each of the wheels of the first desired vehicle.

The equations (1) and (2) are equations of motion of the first desired vehicle. In order to solve these equations, the CPU of the microcomputer 1 must perform two integrations in each interval of $\Delta t$. A method of integration is chosen according to the required accuracy of integration. For example, an integration method expressed as $$A(t+\Delta t) = A(t) + \Delta t \cdot \dot{A}(t)$$

or the Runge-Kutta method may be employed.

The equation of vehicle lateral motion is involved in the operations of the step 42. However, the motion variables ($V_{y1}, \dot{V}_{y1}$) relating to the lateral motion are not used for determining the desired steer angle $\bar{\delta}_F$ because the first desired vehicle is a model for the yawing motion.

At a step 43, the CPU of the microcomputer 1 reads values of vehicle parameters of a second desired vehicle which are stored in the memory. Then, the CPU performs operations to determine one or more desired values of the lateral motion corresponding to the instantaneous values of the steering wheel angle $\theta_s$ and the vehicle speed V, by solving equations of vehicle motion for the second desired vehicle by use of the values of the vehicle parameters of the second desired vehicle and the instantaneous values of $\theta_s$ and V. In this embodiment, the CPU determines a desired value $\bar{a}$ of a lateral acceleration. The second desired vehicle is a real or postulated imaginary vehicle having desired characteristics relating to the lateral motion.

In this embodiment, the following vehicle parameters of the second desired vehicle are used.

$I_{Z2}$ = a yawing moment of inertia of the second desired vehicle.

$M_2$ = a vehicle mass of the second desired vehicle.

$L_{F2}$ = a distance between a front axle and a center of gravity of the second desired vehicle.

$L_{R2}$ = a distance between a rear axle and the center of gravity of the second desired vehicle.

$N_2$ = an overall steering ratio of the second desired vehicle.

$K_{F2}$ = a cornering power of each of front wheels of the second desired vehicle.

$K_{R2}$ = a cornering power of each of rear wheels of the second desired vehicle.

The desired value $\bar{a}$ of the lateral acceleration is determined by using the following equations.

$$M_2(\dot{V}_{y2} + \dot{\phi}_2 V) = 2C_{F2} + 2C_{R2} \tag{7}$$

$$I_{Z2}\ddot{\phi}_2 = 2L_{F2}C_{F2} - 2L_{R2}C_{R2} \tag{8}$$

$$C_{F2} = K_{F2}\left(\frac{\theta_s}{N_2} - (V_{y2} + L_{F2}\dot{\phi}_2)/V\right) \tag{9}$$

$$C_{R2} = -K_{R2}(V_{y2} - L_{R2}\dot{\phi}_2)/V \tag{10}$$

$$\bar{a} = \dot{V}_{y2} + \dot{\phi}_2 V \tag{11}$$

where
$\dot{\phi}_2$ = a yaw rate of the second desired vehicle
$\ddot{\phi}_2$ = a yaw acceleration of the second desired vehicle, $V_{y2}$ = a side velocity (or side speed) of the second desired vahicle in the y-direction, $\dot{V}_{y2}$ = a side acceleration of the second desired vehicle in the y-direction, $C_{F2}$ = a cornering force of each of the front wheels of the second desired vehicle, $C_{R2}$ = a cornering force of each of the rear wheels of the second desired vehicle.

The equations (7) and (8) are equations of motion of the second desired vehicle. The equations (7) and (8) are solved by performing integrations in a similar manner as in the equations (1) and (2).

The equation of yawing motion is involved in the step 43. However, the motion variables ($\dot{\phi}_2, \ddot{\phi}_2$) relating to the yawing motion are not used for determining the desired steer angle because the second desired vehicle is a model for the lateral motion.

The control system of this embodiment determines the desired yaw rate and yaw acceleration ($\bar{\dot{\phi}}, \bar{\ddot{\phi}}$) and the desired lateral acceleration $\bar{a}$, respectively, from the first and second desired vehicles whose vehicle response characteristics are determined independently of each other. Therefore, the desired values ($\bar{\dot{\phi}}, \bar{\ddot{\phi}}$) of the yawing motion and the desired value ($\bar{a}$) of the lateral motion are independent of each other. The control system of this embodiment can freely control the yawing motion characteristics and the lateral motion characteristics of the controlled vehicle.

At steps 44 and 45, the CPU of the microcomputer 1 determines a first desired front wheel steer angle $\delta_\phi$ required to achieve the desired values ($\bar{\dot{\phi}}, \bar{\ddot{\phi}}$) of the yawing motion in the controlled vehicle and a second desired front wheel steer angle $\delta_{60}$ required to achieve the desired value ($\bar{a}$) of the lateral motion in the controlled vehicle, by using values of the parameters characterizing the actual steering response of the controlled vehicle.

The controlled vehicle is the vehicle on which the steering control system of this embodiment is mounted. The following vehicle characterizing parameters of the controlled vehicle are stored in the memory.

$I_{Z3}$ = a yawing moment of inertia of the controlled vehicle.

$M_3$ = a vehicle mass of the controlled vehicle.

$L_{F3}$ = a distance between a front axle and a center of gravity of the controlled vehicle.

$L_{R3}$ = a distance between a rear axle and the center of gravity of the controlled vehicle.

$K_{F3}$ = a cornering power of each of the front wheels of the controlled vehicle.

$K_{R3}$ = a cornering power of each of the rear wheels of the controlled vehicle.

At the step 44, the first desired steer angle $\delta_{100}$ is determined from the desired values ($\bar{\dot{\phi}}, \bar{\ddot{\phi}}$) of the yawing motion by using the following equations.

$$M_3(\dot{V}_{y1} + \bar{\dot{\phi}}V) = 2C_{F1} + 2C_{R1} \tag{12}$$

$$C_{R1} = -K_{R3}(V_{y1} - L_{R3}\bar{\dot{\phi}})/V \tag{13}$$

$$C_{F1} = (L_{R3}C_{R1} + \tfrac{1}{2}\bar{\ddot{\phi}}I_{Z3})/L_{F3} \tag{14}$$

$$\delta_{F1} = \frac{C_{F1}}{K_{F3}} + (V_{y1} + L_{F3}\bar{\dot{\phi}})/V \tag{15}$$

$$\delta_\phi = \delta_{F1} \tag{16}$$

The motion variables (state variables) appearing in these equations are the quantities defining the state of the controled vehicle, calculated from these equations. These motion variables are as follows:

$V_{yI}$=a side velocity (side speed) of the controlled vehicle in the y-direction.

$\dot{V}_{yI}$=a side acceleration of the controlled vehicle in the y-direction.

$C_{FI}$=a cornering force of each of the front wheels of the controlled vehicle.

$C_{RI}$=a cornering force of each of the rear wheels of the controlled vehicle.

In the equation (16), $\delta_{FI}$ is a front wheel steer angle of the controlled vehicle obtained from the equations.

At the step 45, the second desired steer angle $\delta_{60}$ is determined from the desired value ($\alpha$) of the lateral motion, and the same characterizing parameters of the controlled vehicle by using the following equations.

$$I_{Z3}\ddot{\phi}_{II}=2L_{F3}C_{FII}-2L_{R3}C_{RII} \quad (17)$$

$$\dot{V}_{yII}=\overline{a}-\dot{\phi}_{II}V \quad (18)$$

$$C_{RII}=-K_{R3}(V_{yII}-L_{R3}\dot{\phi}_{II})/V \quad (19)$$

$$C_{FII}=\tfrac{1}{2}M_3\overline{a}-C_{RII} \quad (20)$$

$$\delta_{FII}=\frac{C_{FII}}{K_{F3}}+(V_{yII}+L_{F3}\dot{\phi}_{II})/V \quad (21)$$

$$\delta_{60}=\delta_{FII} \quad (22)$$

The motion variables (state variables) appearing in these equations are the quantities calculated from these equations. Therefore, the value of each of these motion variables is not equal to the value of the motion variable of the same kind appearing in the step 44. The motion variables of the step 45 are as follows:

$\dot{\phi}_{II}$=a yaw rate of the controlled vehicle.

$\ddot{\phi}_{II}$=a yaw acceleration of the controlled vehicle.

$V_{yII}$=a side velocity (side speed) of the controlled vehicle in the y-direction.

$\dot{V}_{yII}$=a side acceleration of the controlled vehicle in the y-direction.

$C_{FII}$=a cornering force of each of the front wheels of the controlled vehicle.

$C_{RII}$=a cornering force of each of the rear wheels of the controlled vehicle.

In the equation (22), $\delta_{FII}$ is a front wheel steer angle determined by these equations.

At a step 46, the CPU of the microcomputer 1 determines a weighted average of the first and second desired steer angles $\delta_\phi$ and $\delta_\alpha$. In this embodiment, weights are functions of the vehicle speed V. The control system of this embodiment adjusts the relative importance of each of the yawing motion and the lateral motion in dependence on the vehicle speed V.

For example, at low vehicle speeds, it is desirable to control the vehicle response characteristics so as to give greater weight to the yawing motion because the slip angles of tires are smaller at low vehicle speeds. As the vehicle speed increases, the weight of the lateral motion should be increased to provide optimum performance.

The weights used in this embodiment are as follows:

$$f_1(V)=\frac{A}{A+V^2} \quad (23)$$

$$f_2(V)=\frac{V^2}{A+V^2} \quad (24)$$

where A is an arbitrary constant. At the step 46, the CPU of the microcomputer 1 determines a final desired front wheel steer angle $\overline{\delta}_F$ which is the weighted average given by:

$$\overline{\delta}_F=f_1(V)\delta_{100}+f_2(V)\delta_\alpha \quad (25)$$

As known from the equation (25), the final desired front wheel steer angle $\overline{\delta}_F$ approximately equals the first desired steer angle $\delta_\phi$ to achieve the desired yawing motion when the vehicle speed V approximately equals zero, and the final desired front wheel steer angle $\overline{\delta}_F$ approximately equals the second desired steer angle $\delta_{60}$ to achieve the desired lateral motion when the vehicle speed V is much greater than zero.

At a step 47, the CPU delivers an output signal representing the thus-determined final desired front wheel steer angle $\overline{\delta}_F$ to the front wheel steering regulator 4. In response to this signal, the front wheel steering regulator 4 supplies the oil pressure to the hydraulic actuator 6 to steer the front wheels 9 and 10 so that the actual steer angle of the front wheels are maintained equal to the final desired angle $\overline{\delta}_F$.

Thus, the control system of this embodiment can always provide optimum steering control by adjusting the weights of the control of the yawing motion and the control of the lateral motion in accordance with the vehicle speed.

Figure 5A:
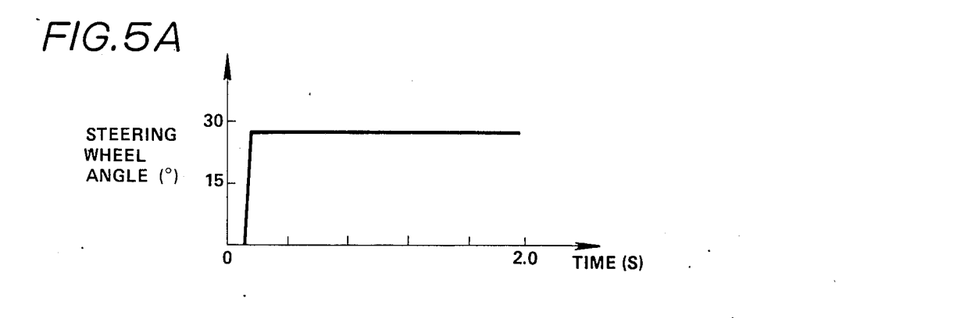
FIGS. 5A-5C are diagrams showing characteristics of a controlled vehicle of the first embodiment.
Figure 5B:
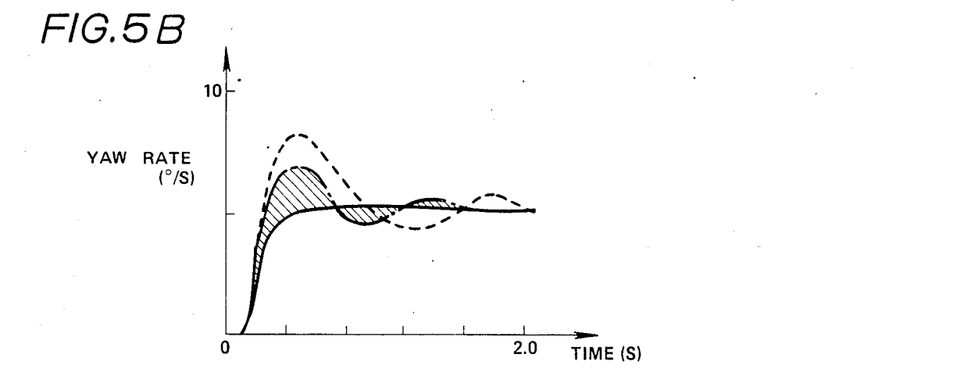
Figure 5C:
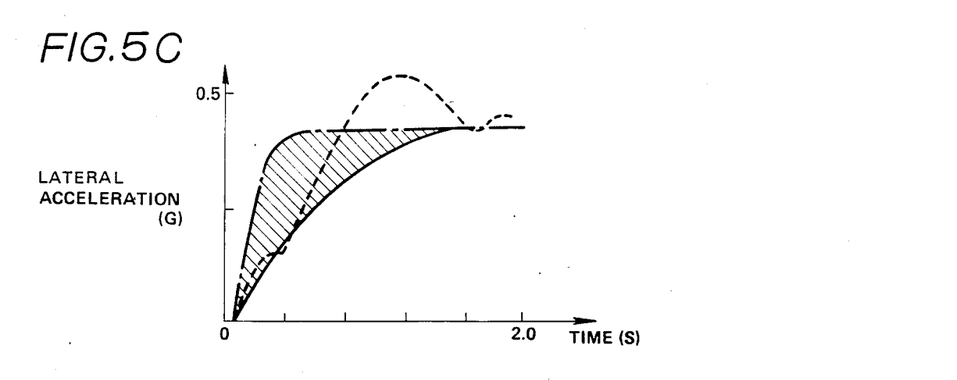

FIGS. 5A, 5B and 5C show response characteristics of yaw rate and lateral acceleration of the controlled vehicle equipped with the control system of the first embodiment.

When the steering wheel angle is changed abruptly as shown in FIG. 5A, both of the yaw rate and lateral acceleration of a conventional vehicle having only conventional mechanical steering linkage become oscillatory and unstable as shown by broken lines in FIGS. 5B and 5C.

Solid lines in FIGS. 5B and 5C show changes in yaw rate and lateral acceleration of the controlled vehicle of the first embodiment with respect to the change of steering wheel angle shown in FIG. 5A when the first weight $f_1(V)$ equals one and the second weight $f_2(V)$ equals zero. One-dot chain lines in FIGS. 5B and 5C show changes in yaw rate and lateral acceleration of the controlled vehicle of the first embodiment with respect to the input change of FIG. 5A when the first weight $f_1(V)$ equals zero and the second weight $f_2(V)$ equals one. Each of the yaw rate and lateral acceleration of the controlled vehicle of the first embodiment is controlled within a hatched area bounded between the solid line and one-dot chain lines in accordance with the change of the vehicle speed.

When $f_1(V)$ equals one and $f_2(V)$ equals zero, as shown by the solid lines, importance is attached to the yawing motion, so that the yaw rate does not become oscillatory and responds sufficiently. In this case, the response of the lateral acceleration is slow but it does not become oscillatory.

When $f_1(V)$ equals zero and $f_2(V)$ equals one, importance is attached to the lateral motion so that the response characteristics of the lateral acceleration are improved. In this case, the yaw rate oscillates slightly, but the amplitude of the oscillation is not so great as that of the conventional vehicle.

Figure 6:
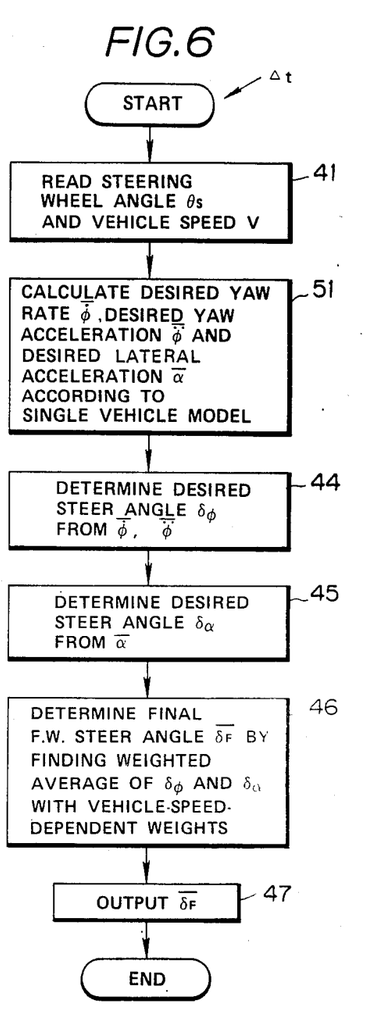
FIGS. 6-8 are flowcharts of programs similar to FIG. 4, but showing second, third and fourth embodiments according to the first aspect of the invention.

A second embodiment of the present invention employs a control program shown in FIG. 6 in place of the program of FIG. 4. Steps 41, 44, 45, 46 and 47 of FIG. 6 are identical, respectively, to the steps 41, 44, 45, 46 and 47 of FIG. 4. The second embodiment is different from the first embodiment only in a step 51.

In the first embodiment, the desired values of the yawing motion and lateral motion are determined by using the two different desired vehicle. In the second embodiment, the desired values $\dot{\phi}$ and $\ddot{\phi}$ of the yawing motion and the desired value $\bar{\alpha}$ of the lateral motion are determined from a single desired vehicle at the step 51.

At the step 51, the CPU of the microcomputer 1 determines the desired value $\dot{\phi}$ of the yaw rate and the desired value $\ddot{\phi}$ of the yaw acceleration by using the equations (1)-(6), and further performs operations to determine a sideslip angle $\beta$ of the center of gravity. and to determine the desired value $\bar{\alpha}$ of the lateral acceleration from the sideslip angle $\beta$ of the center of gravity, the yaw rate $\dot{\phi}$ and the vehicle speed V.

The thus-determined $\dot{\phi}$, $\ddot{\phi}$ and $\bar{\alpha}$ are used to determine the first and second desired steer angles $\delta_\phi$, $\delta_\alpha$ at the steps 44 and 45 in the same manner as in the steps 44 and 45 of FIG. 4. At the step 46, the final desired steer angle $\bar{\delta}_F$ is determined in the same manner as in the first embodiment by using the weights each of which is a function of the vehicle speed V.

The effect obtained by the second embodiment is similar to the effect of the first embodiment. In the second embodiment, the desired values $\dot{\phi}$, $\ddot{\phi}$ and $\bar{\alpha}$ are interrelated because they are determined from only one desired vehicle. Therefore, it is necessary to choose a vehicle having desired characteristics in both of yawing and lateral motions as the single desired vehicle of the second embodiment.

Figure 7:
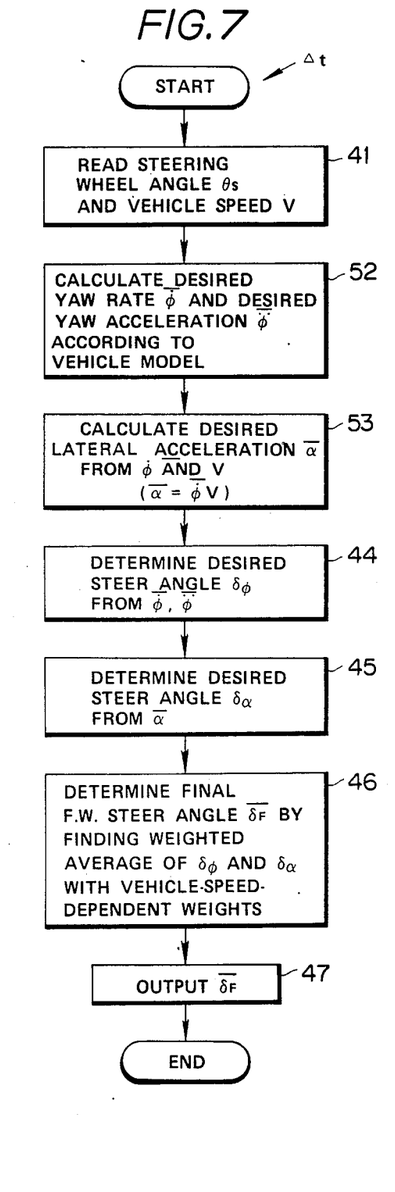

A third embodiment of the present invention is shown in FIG. 7.

In the third embodiment, the desired values $\dot{\phi}$, $\ddot{\phi}$ of the yawing motion are determined from a single desired vehicle by using the equations (1)-(6) at a step 52, as in the second embodiment.

Unlike the second embodiment, the desired value $\bar{\alpha}$ of the lateral acceleration of the third embodiment is determined by multiplying the desired value $\dot{\phi}$ of the yaw rate determined at the step 52 by the vehicle speed V, at a step 53.

That is:

$$\bar{\alpha} = \dot{\phi} V \qquad (26)$$

The equation (26) does not include the sideslip angle $\beta$ of the center of gravity. That is, the step 53 of the third embodiment determines the desired value $\bar{\alpha}$ of the lateral acceleration so as to make the sideslip angle $\beta$ of the center of gravity equal to zero.

The control system of the third embodiment can steer the controlled vehicle so that the sideslip angle $\beta$ of its center of gravity is always maintained equal to zero (That is, the vehicle body always faces toward the direction of movement.).

Figure 8:
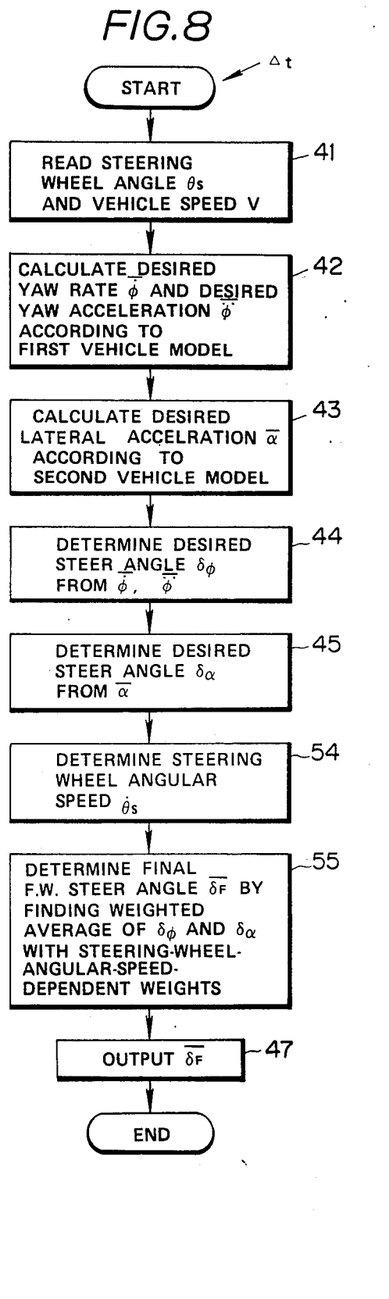

A fourth embodiment of the present invention is shown in FIG. 8. The fourth embodiment is different from the first embodiment only at steps 54 and 55 of FIG. 8.

In the first embodiment, the weights for determining the weighted average of the first and second desired steer angles are functions of the vehicle speed V. In the fourth embodiment, the CPU of the microcomputer 1 shown in FIG. 2 determines a steering wheel angular speed $\dot{\theta}_s$ (the time rate of change of the steering wheel angle $\theta_s$) at the step 54, and uses weights which are functions of the steering wheel angular speed $\dot{\theta}_s$, for obtaining the weighted average at the step 55.

In an emergency requiring the driver to avoid an obstruction by moving quickly aside, for example, the steering control giving importance to the lateral motion rather than the yawing motion is advantageous. In normal situations, the vehicle steering response of yawing motion is more important.

Figure 9A:
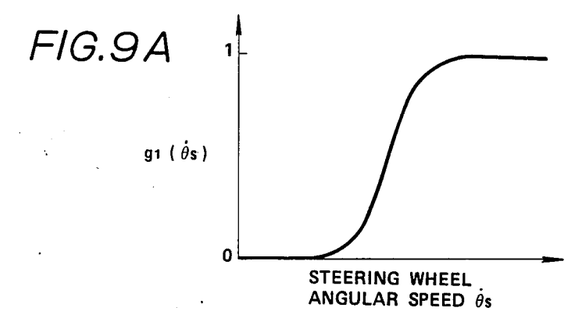
FIGS. 9A and 9B are diagrams showing functional relationships of weights used for determining a weighted average in the fourth embodiment of FIG. 8.
Figure 9B:
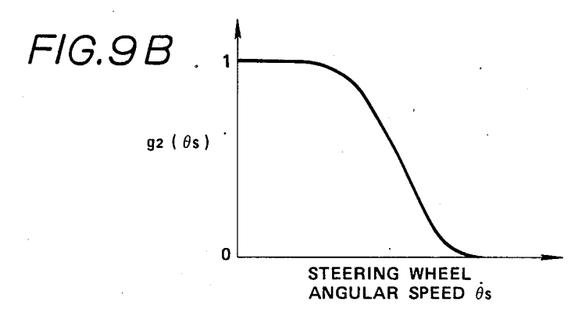

At the step 55, the CPU of the microcomputer 1 obtains values of functions $g_1(\dot{\theta}_s)$ and $g_2(\dot{\theta}_s)$ corresponding to an instantaneous value of the steering wheel angular speed $\dot{\theta}_s$ from a table or tables of function values stored in the memory. FIGS. 9A and 9B show the functions $g_1(\dot{\theta}_s)$ and $g_2(\dot{\theta}_s)$ used in the fourth embodiment. Then the final desired front wheel steer angle $\bar{\delta}_F$ is determined by the following equation.

$$\bar{\delta}_F = g_1(\dot{\theta}_s)\delta_\alpha + g_2(\dot{\theta}_s)\delta_\phi \qquad (27)$$

As shown in FIG. 9A, $g_1(\dot{\theta}_s)$ equals one when $\dot{\theta}_s$ is large, and equals zero when the $\dot{\theta}_s$ is small. The function $g_2(\dot{\theta}_s)$ changes oppositely as shown in FIG. 9B.

Thus, the control system of the fourth embodiment gives more importance to the lateral motion when the steering wheel angular speed $\dot{\theta}_s$ is higher, and gives more importance to the yawing motion when $\dot{\theta}_s$ is low.

It is possible to replace the step 46 of FIG. 6 of the second embodiment by the steps 54 and 55 shown in FIG. 8, or to replace the step 46 of the third embodiment of FIG. 7 by the steps 54 and 55.

It is possible to use weights each of which is a function of both of the vehicle speed V and the steering wheel angular speed $\dot{\theta}_s$ to adjust the weights of the yawing motion and lateral motion in accordance with both of the vehicle speed V and the steering wheel angular speed $\dot{\theta}_s$.

The control system shown in FIG. 2 is arranged to steer only the front wheel pair. However, the control system of each embodiment of the present invention may be arranged to steer either or both of the front wheel pairs.

It is optional to employ another motion variable (such as a cornering force) in addition to the motion variable relating to the yawing motion and the motion variable relating to the lateral motion. The number and kinds of the vehicle motion variables used to determine the desired vehicle behavior are not limited to what are described in the preceding embodiments.

According to the present invention, the steering response can be controlled very freely. For example, it is possible to perform a steering control giving importance to the lateral motion when the steering wheel is turned rapidly at high vehicle speed, and to perform a steering control giving importance to the yawing motion when the vehicle speed is low or when the steering wheel speed is low.

Figure 10:
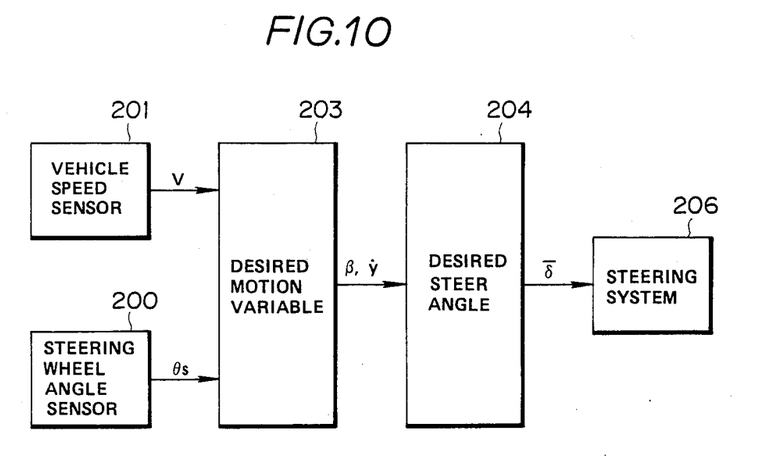
FIG. 10 is a block diagram of a second aspect of the invention.

FIG. 10 shows a second aspect of the present invention. A control system of FIG. 10 includes a steering wheel angle sensor or sensing means 200, a vehicle speed sensor or sensing means 201, a control means having a desired motion variable determining means 203 and a desired steer angle determining means 204, and a steering system 206 having an actuator such as a hydraulic actuator.

The desired motion variable determining means 203 determines a desired value of a vehicle sideslip angle or a vehicle side speed corresponding to a sensed steering wheel angle and a sensed vehicle speed, according to a desired vehicle model. From the desired value $\beta$ of the sideslip angle or the desired value $\dot{y}$ of the side speed, and actual values of the vehicle parameters of the controlled vehicle, the desired steer angle determining means 204 determines a desired value $\bar{\delta}$ of a steer angle of at least one of the front and rear wheel pairs, required to achieve the desired value $\beta$ of the sideslip angle or the desired value $\dot{y}$ of the side speed in the controlled vehicle. The actuator of the steering system 206 steers at least one of the front and rear wheel pairs in accordance with the desired value $\bar{\delta}$ of the steer angle.

Figure 11:
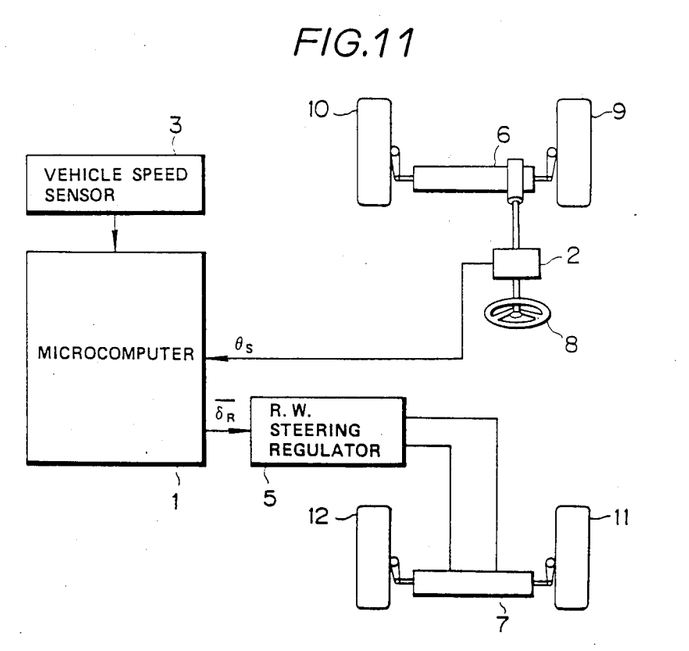
FIG. 11 is a schematic view showing a fifth embodiment according to the second aspect of the invention.

A fifth embodiment according to the second aspect of the present invention is shown in FIG. 11.

The control unit 1 such as a microcomputer receives the steering wheel angle $\theta_s$ and the vehicle speed V, respectively, from the steering wheel angle sensor 2 and the vehicle speed sensor 3, as in the preceding embodiments. Unlike the preceding embodiments, the control unit 1 of the fifth embodiment outputs a desired rear wheel steering angle $\bar{\delta}_R$ for the rear wheels 11 and 12 by processing the input signals.

A front wheel steering actuator 6 of the fifth embodiment is a mechanical steering linkage of a conventional type, so that the front wheels 9 and 10 of the controlled vehicle are steered in accordance with the steering amount of the steering wheel 8.

The rear wheels 11 and 12 are steered by a rear wheel steering hydraulic actuator 7, which is controlled by a rear wheel steering regulator 5. The regulator 5 receives the output signal of the control unit 1 representing the desired rear wheel steer angle, and controls the oil pressure supplied to the rear wheel steering actuator 7 so as to maintain an actual steer angle $\delta_R$ of the rear wheels 11 and 12 equal to the desired angle $\bar{\delta}_R$. The rear wheel steering regulator 5 is essentially identical to the front wheel steering regulator 4 shown in FIG. 3, and the rear wheel steering actuator 7 is essentially identical to the front wheel steering hydraulic actuator 6 shown in FIG. 3 (as disclosed in a copending U.S. patent application Ser. No. 773,650 filed Sept. 9, 1985, and a Japanese patent application No. Showa 59-188153).

Figure 12:
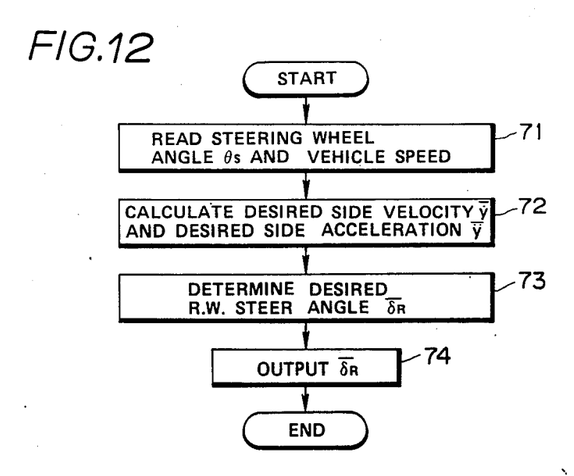
FIG. 12 is a flowchart of a program used in the fifth embodiment.

When the control unit 1 is a microcomputer, it repeats a program shown in FIG. 12 at regular intervals.

A step 71 is the same as the step 41 of FIG. 4. At a step 72, a CPU of the microcomputer 1 determines a desired value $\dot{y}$ ($=\bar{V}_y$) of a side velocity (side speed) and a desired value $\ddot{y}$ ($=\bar{Y}_y$) of a side acceleration corresponding to the instantaneous values of the steering wheel angle $\theta_s$ and the vehicle speed V by using mathematical equations representing a desired vehicle having desired response characteristics.

The following equations are used to determine $\bar{y}$ and $\bar{\dot{y}}$ at the step 72.

$$G_Y = V/\{(1.0 + A \cdot V^2)L \cdot N\} \tag{31}$$

$$G_B = \frac{1}{N} - \left(1 + \frac{M \cdot L_R \cdot V^2}{2L \cdot L_F \cdot K_F}\right) \frac{L_F}{V} \cdot G_Y \tag{32}$$

$$G_{DY} = G_B \cdot V \tag{33}$$

$$\ddot{y} = G_{DY}\omega^2 \theta_s - 2\xi\omega\dot{y} - \dot{y}\omega^2 \tag{34}$$

$$\int \ddot{y}dt = \dot{y} = y \tag{35}$$

$$\int \dot{y}dt = \hat{y} = \bar{y} \tag{36}$$

where
N = an overall steering ratio of the controlled vehicle,
L = a wheelbase of the controlled vehicle,
$L_F$ = a distance between a front axle and a center of gravity of the controlled vehicle,
$L_R$ = a distance between a rear axle and the center of gravity of the controlled vehicle,
M = a vehicle mass of the controlled vehicle,
$K_F$ = a cornering power of each of the front wheels of the controlled vehicle,
$G_Y$ = a desired yaw rate gain,
$G_B$ = a desired sideslip angle gain,
$G_{DY}$ = a control gain,
$\xi, \omega$ = control parameters whose values are determined in accordance with vehicle parameters and desired vehicle response characteristics,
A = a desired stability factor.

The equation (34) is obtained from a transfer function of a second-order lag which is expressed as:

$$\frac{\dot{y}}{\theta_s} = \frac{G_{DY} \cdot \omega^2}{S^2 + 2\xi\omega S + \omega^2} \tag{37}$$

(where S is a Laplace operator, or Laplacian) That is the desired vehicle of the fifth embodiment is a vehicle having the transfer characteristic of the side velocity expressed by the equation (37).

At a step 73, the CPU of the microcomputer 1 performs operations to determine a desired rear wheel steer angle $\bar{\delta}_R$ which is required to achieve the desired value $\dot{y}$ of the side velocity and the desired value $\ddot{y}$ of the side acceleration in the controlled vehicle.

The desired rear wheel steer angle $\bar{\delta}_R$ is determined by using the following equations.

$$\ddot{\phi} = 2(C_F L_F - C_R L_R)/I_Z \tag{38}$$

$$\dot{\phi} = \int \ddot{\phi} dt \tag{39}$$

$$\beta_F = \frac{\theta_s}{N} - (\ddot{y} + L_F \cdot \dot{\phi})/V \tag{40}$$

$$C_F = K_F \beta_F \tag{41}$$

$$C_R = M(\ddot{y} + V \cdot \dot{\phi})/2 - C_F \tag{42}$$

$$\beta_R = C_R/K_R \tag{43}$$

$$\delta_R = \beta_R + (\ddot{y} - L_R \cdot \dot{\phi})/V \tag{44}$$

where
$\ddot{\phi}$ = a yaw acceleration of the controlled vehicle,
$\dot{\phi}$ = a yaw rate of the controlled vehicle,
$C_F$ = a cornering force of each of the front wheels of the controlled vehicle,
$C_R$ = a cornering force of each of the rear wheels of the controlled vehicle,
$I_Z$ = a yawing moment of inertia of the controlled vehicle, $\beta_F$ = a slip angle of the front wheels of the controlled vehicle, $\beta_R$ = a slip angle of the rear wheels of the controlled vehicle, $K_R$ = a cornering power of each of the rear wheels of the controlled vehicle.

At a step 74, the microcomputer 1 outputs the thus-determined desired rear wheel steer angle $\bar{\delta}_R$ to the rear wheel steering regulator 5. The regulator 5 steers the rear wheels 11 and 12 of the controlled vehicle by supplying the hydraulic actuator 7 with the oil pressure required to steer the rear wheels 11 and 12 to the desired rear wheel steer angle $\bar{\delta}_R$.

Consequently, the side velocity and the side acceleration of the controlled vehicle are maintained equal to those of the desired vehicle, i.e. the desired values of the side velocity and acceleration, so that the controlled vehicle behaves as if it were the desired vehicle.

The steering control system of this embodiment can improve the controllability of the controlled vehicle by making the response of the lateral acceleration with respect to the steering wheel angular displacement speedier at high vehicle speeds, as shown in FIGS. 13A–13E and 14A–14E.

Figure 13A:
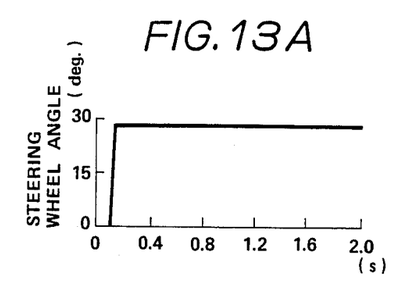
FIGS. 13A-13E are diagrams showing characteristics of a controlled vehicle of the fifth embodiment and a conventional vehicle.
Figure 13B:
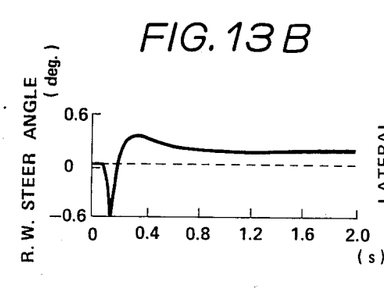
Figure 13C:
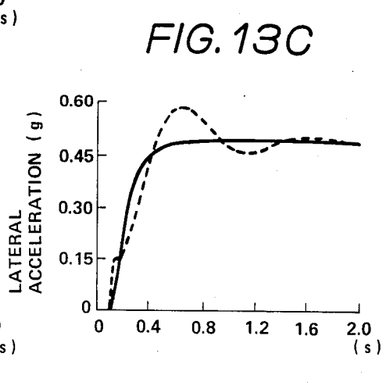
Figure 13D:
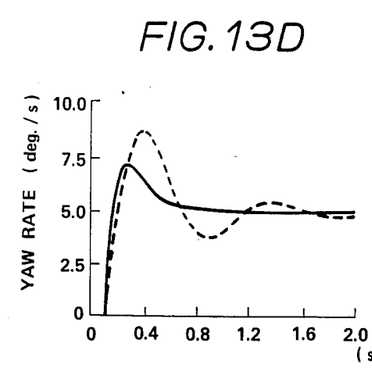
Figure 13E:
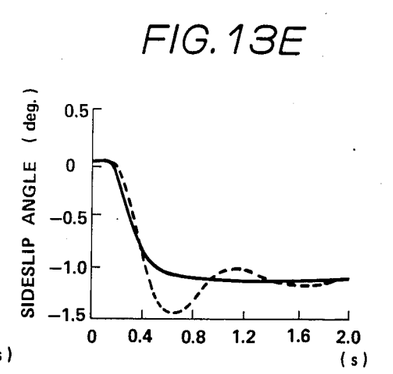

FIGS. 13B–13E show time variations of actual rear wheel steer angle, lateral acceleration, yaw rate and sideslip angle, resulting when the steering wheel angle is changed as shown in FIG. 13A at a vehicle speed of 200 km/h. Solid lines show characteristics of the controlled vehicle equipped with the control system of the fifth embodiment, and broken lines show those of a conventional vehicle (in which only front wheels are steered). As known from these figures, the responses of all the lateral acceleration, sideslip angle and yaw rate are speedier than those of the conventional vehicle, and none of them becomes oscillatory.

Figure 14A:
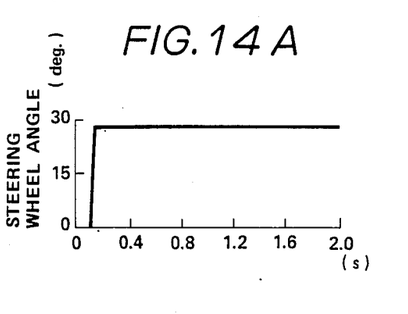
FIGS. 14A-14E are diagrams showing characteristics of the controlled vehicle and a comparative vehicle shown in related patent applications.
Figure 14B:
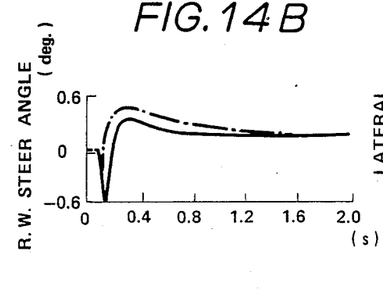
Figure 14C:
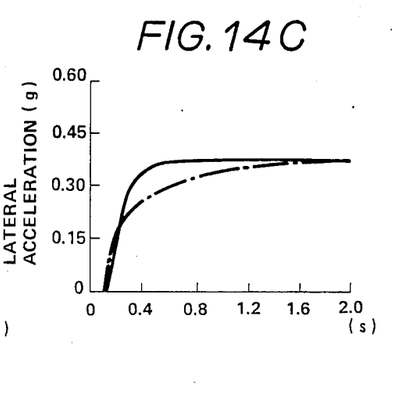
Figure 14D:
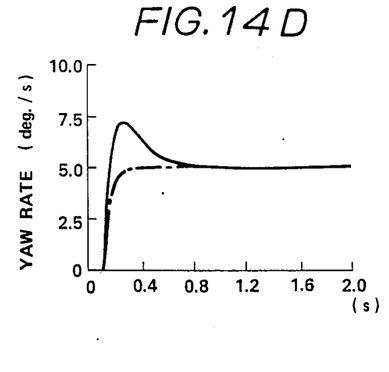
Figure 14E:
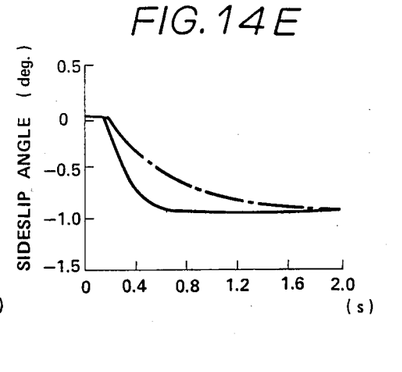

FIGS. 14B–14E show time variations of actual rear wheel steer angle, lateral acceleration, yaw rate and sideslip angle resulting when the steering wheel angle is changed as shown in FIG. 14A at a vehicle speed of 200 km/h. Solid lines show characteristics of the controlled vehicle equipped with the control system of the fifth embodiment, and one-dot chain lines show those of a comparative vehicle equipped with one of the control systems of the above-mentioned patent application Ser. Nos. 755,352; 773,650 etc. which are arranged to control the yaw rate mainly. As known from these figures, the comparative vehicle is superior in characteristic of yaw rate. However, the controlled vehicle of the fifth embodiment is superior in characteristics of lateral acceleration and sideslip angle.

The control system of the fifth embodiment may be arranged to determine a desired value of the sideslip angle instead of the side velocity and side acceleration. In this case, the control unit 1 determines a desired value $\bar{\beta}$ of the sideslip angle at the step 72 of FIG. 12 by using the transfer function of the sideslip angle expressed by the following equation (45) similar to the equation (37).

$$\frac{\beta}{\theta_S} = \frac{G_{DY} \cdot \omega^2}{S^2 + 2\xi\omega S + \omega^2} \quad (45)$$

(where $\beta$ is a sideslip angle of the center of gravity.)

The fifth embodiment can be modified to use two desired vehicles, one for determining the desired values $\bar{y}, \bar{\dot{y}}$ of the side velocity and acceleration, or the desired value $\bar{\beta}$ of the sideslip angle, and the other for determining a desired value $\bar{\phi}$ of the yaw rate. In this case, the control unit 1 determines a first desired rear wheel steer angle from one or more desired values obtained from a first one of the desired vehicles and a second desired rear wheel steer angle from one or more desired motion variables obtained from a second one of the desired vehicles. Then, the control unit 1 determines a weighted average of the first and second desired rear wheel steer angles by using the weights dependent on the vehicle speed as in the first embodiment, or the weights dependent on the steering wheel angular speed as in the fourth embodiment. The thus-determined weighted average is supplied to the rear wheel steering regulator 5 as the desired rear wheel steer angle. This modification can provide a speedy response of the lateral accleration in a high vehicle speed range without adversely affecting the response and stability of the yaw rate.

The fifth embodiment may be modified so as to steer both of the front and rear wheel pairs or to steer the front wheel pair only as shown in FIG. 2.

What is claimed is:

1. A steering control system for a controlled vehicle, comprising:

means for sensing a steering wheel angle of said controlled vehicle, means for sensing a vehicle speed of said controlled vehicle, control means connected with said steering wheel angle sensing means and said vehicle speed sensing means for determining desired values of first and second vehicle motion variables corresponding to the sensed steering wheel angle and the sensed vehicle speed by solving at least one desired mathematical vehicle model representing a desired vehicle, determining first and second desired values of a steer angle, respectively, from said desired values of said first and second motion variables by solving an actual mathematical vehicle model representing said controlled vehicle, and determining a weighted average of said desired values of said steer angle, and actuating means for steering at least one wheel of said controlled vehicle so that an actual steer angle of said wheel is maintained equal to said weighted average.

2. A steering control system according to claim 1 wherein said desired vehicle model is a group to mathematical equations defining relationships of said motion variables and vehicle parameters characterizing a steering response of said desired vehicle, and said actual vehicle model is a group of mathematical equations defining relationships among said motion variables and vehicle parameters characterizing the actual steering response of said controlled vehicle.

3. A steering control system according to claim 2 wherein said control means solves each of said mathematical vehicle models by preforming an integration process to determine an output quantity substantially equal to a time integral of an input quantity during actual turning movement of said controlled vehicle.

4. A steering control system according to claim 1 wherein said control means determines a desired value of at least one further vehicle motion variable, and at least one further desired value of said steer angle from said desired value of said further vehicle motion variable, and determines said weighted average from said first and second desired values and said further desired value of said steer angle.

5. A steering control system according to claim 1 wherein said control means determines said desired value of said first vehicle motion variable by using a first desired mathematical vehicle model and said desired value of said second vehicle motion variable by using a second desired mathematical vehicle model.

6. A steering control system according to claim 5 wherein said first vehicle motion variable is a yaw rate and said second vehicle motion variable is a lateral acceleration.

7. A steering control system according to claim 6 wherein said weighted average is equal to a sum of a first product obtained by multiplying said first desired value by a first weight and a second product obtained by multiplying said second desired value by a second weight where a sum of said first and second weights is equal to one, each of said first and second weights being a function of the sensed vehicle speed.

8. A steering control system according to claim 7 wherein said first weight is equal to a quotient obtained by diving a constant by a sum of said constant and the second power of the sensed vehicle speed, and said second weight is equal to a quotient obtained by diving the second power of the sensed vehicle speed by said sum of said constant and the second power of the sensed vehicle speed.

9. A steering control system according to claim 8 wherein said control means determines a desired value of a yaw acceleration in addition to said desired value of said yaw rate by using said first desired mathematical vehicle model, and determines said first desired value of said steer angle by using both of said desired values of said yaw rate and said yaw acceleration.

10. A steering control means according to claim 9 wherein said controlled vehicle has a pair of right and left first wheels and a pair of right and left second wheels, said steer angle is a first wheel steer angle of said first wheels, and said actuating means steers said first wheels.

11. A steering control means according to claim 10 wherein said control means further determines first and second desired values of a second wheel steer angle, respectively, from said desired values of said first and second motion variables by using said said vehicle parameters characterizing the actual steering response of said controlled vehicle, and determines a weighted average of said desired values of said second wheel steer angle, said actuating means further steering said second wheels of said controlled vehicle so that an actual steer angle said second wheels is maintained equal to said weighted average of said second wheel steer angle.

12. A steering control system according to claim 6 wherein said control means determines a steering wheel angular speed from the sensed steering wheel angle and wherein said weighted average is equal to a first product obtained by multiplying said first desired value by a yaw weight and a second product obtained by multiplying said second desired value by a lateral motion weight where a sum of said yaw weight and lateral motion weight is equal to one, each of said first and second weights being a function of said steering wheel angular speed.

13. A steering control system according to claim 12 wherein said yaw weight decreases from one to zero and said lateral motion weight increases from zero to one as said steering wheel angular speed increases.

14. A steering control system according to claim 1 wherein said first motion variable is a yaw rate and said second motion variable is a lateral acceleration, and wherein said desired value of said lateral acceleration is set equal to a product obtained by multiplying said desired value of said yaw rate by the sensed vehicle speed.

15. A steering control system according to claim 1 wherein said first motion variable is yaw rate, and said second motion variable in a vehicle side speed, and said control means determines said desired value of said side speed so that said desired value of said side speed is related to the sensed steering wheel angle by a transfer characteristic of second-order lag.

16. A steering control system according to claim 1 wherein said first motion vehicle is a yaw rate and said second motion variable is a vehicle sideslip angle, and said control means determines said desired value of said vehicle sideslip angle so that said desired value of said sideslip angle is related to the sensed steering wheel angle by a transfer characteristic of a second-order lag.

17. A steering control system for a controlled vehicle, comprising:
means for sensing a steering wheel angle of said controlled vehicle,
means for sensing a vehicle speed of said controlled vehicle,
control means connected with said steering wheel angle sensing means and said vehicle speed sensing means for determining a desired value of a vehicle side motion variable relating to vehicle side slipping motion, corrsponding to the sensed steering wheel angle and the sensed vehicle speed by using a desired mathematical vehicle model, and determining a desired value of a steer angle required to achieve said desired value of said side motion variable in said controlled vehicle, from said desired value of said side motion variable by solving an actual mathematical vehicle model representing said controlled vehicle, and
actuating means for steering at least one wheel of said controlled vehicle so that an actual steer angle of said wheel is maintained equal to said desired value of said steer angle.

18. A steering control system according to claim 17 wherein said control means determines said desired value of said vehicle side motion variable so that said desired value of said side motion variable is related to the sensed stering wheel angle by a transfer characteristic of a second-order lag.

19. A steering control system according to claim 18 wherein said vehicle side motion variable is a vehicle side speed.

20. A steering control system according to claim 18 wherein said vehicle side motion variable is a vehicle sideslip angle.

* * * * *